(12) United States Patent
Ogino

(10) Patent No.: US 8,493,596 B2
(45) Date of Patent: Jul. 23, 2013

(54) PRINTER DRIVER, RECORDING MEDIUM, INFORMATION PROCESSING APPARATUS, PRINTING SYSTEM, AND PRINTER DRIVER SETTING METHOD

(75) Inventor: Kumiko Ogino, Osaka (JP)

(73) Assignee: Sharp Kabushiki Kaisha, Osaka (JP)

(*) Notice: Subject to any disclaimer, the term of this patent is extended or adjusted under 35 U.S.C. 154(b) by 686 days.

(21) Appl. No.: 12/753,218

(22) Filed: Apr. 2, 2010

(65) Prior Publication Data

US 2010/0271661 A1    Oct. 28, 2010

(30) Foreign Application Priority Data

Apr. 24, 2009 (JP) ................................ 2009-106431

(51) Int. Cl.
*G06F 3/12* (2006.01)
*G06K 15/00* (2006.01)
(52) U.S. Cl.
USPC ........................................ 358/1.15; 358/1.13
(58) Field of Classification Search
None
See application file for complete search history.

(56) References Cited

U.S. PATENT DOCUMENTS

| | | | | |
|---|---|---|---|---|
| 5,580,177 A | * | 12/1996 | Gase et al. | 400/61 |
| 2002/0067504 A1 | * | 6/2002 | Salgado et al. | 358/1.15 |
| 2006/0061789 A1 | * | 3/2006 | Yamaoka et al. | 358/1.13 |
| 2007/0115493 A1 | | 5/2007 | Haginaka et al. | |

FOREIGN PATENT DOCUMENTS

| | | |
|---|---|---|
| CN | 1967557 | 5/2007 |
| JP | 2004-302978 | 10/2004 |
| JP | 2005-332100 | 12/2005 |
| JP | 2006-048433 | 2/2006 |
| JP | 2007-122137 | 5/2007 |
| JP | 2007-140909 | 6/2007 |

* cited by examiner

*Primary Examiner* — Dov Popovici
(74) *Attorney, Agent, or Firm* — Edwards Wildman Palmer LLP; David G. Conlin; Steven M. Jensen

(57) ABSTRACT

Update initial set values set by a manager are able to be obtained each time a printer driver is activated and changing of a setting such as changing of printing conditions due to ecology-printing etc., and changing of an option configuration such as a large capacity cassette is reflected promptly and reliably. The printer driver includes an access portion which accesses an MFP storing initial set values of the printer driver in each activation, a set value comparing portion which compares initial set values set to the printer driver and initial set values stored in the MFP, and a set value selecting portion which selects either initial set values of the printer driver or initial set values of the MFP based on a comparison result.

12 Claims, 13 Drawing Sheets

FIG. 3

| | |
|---|---|
| INITIAL SET VALUE LIST TABLE | |
| NUMBER OF COPIES | 1 |
| SINGLE-SIDED/DOUBLE-SIDED PRINTING | SINGLE-SIDED PRINTING |
| N-UP PRINTING | 2-UP |
| COLOR MODE | FULL COLOR |
| SHEET SIZE | A4 |

FIG. 4

| | |
|---|---|
| INITIAL SET VALUE PRIORITY ORDER LIST TABLE | |
| NUMBER OF COPIES | 1>2>···>N |
| SINGLE-SIDED/DOUBLE-SIDED PRINTING | DOUBLE-SIDED SINGLE-SIDED |
| N-UP PRINTING | N-UP>N-1-UP>···>1-UP |
| COLOR MODE | MONOCHROME>COLOR |
| SHEET SIZE | A4>A3 |

PRINTER DRIVER, RECORDING MEDIUM, INFORMATION PROCESSING APPARATUS, PRINTING SYSTEM, AND PRINTER DRIVER SETTING METHOD

CROSS-NOTING PARAGRAPH

This non-provisional application claims priority under 35 U.S.C. §119(a) on Patent Application No. 2009-106431 filed in JAPAN on Apr. 24, 2009, the entire contents of which are hereby incorporated herein by reference.

FIELD OF THE INVENTION

The present invention relates to a printer driver, a recording medium, an information processing apparatus, a printing system, and a printer driver setting method, and more specifically, to a printer driver for enabling update of initial set values at the time of activation of the printer driver, a recording medium, an information processing apparatus, a printing system, and a printer driver setting method.

BACKGROUND OF THE INVENTION

In recent years, in order to address environmental problems, activity for reducing the amount of $CO_2$ discharged is spread and distribution by an electronic file using an electronic mail etc., and an electronic filing are increased to reduce a quantity of printed copies, however, it is realistically difficult to eliminate printing on a recording sheet in companies etc. Thus, in companies etc., by performing so-called ecology-printing to reduce the number of recording sheets to be printed, efforts to reduce recording sheets, toner, and power consumption at the time of printing are being made. Specifically, the ecology-printing as described above is able to be performed, for example, by switching color printing, single-sided printing, and one in one (one-up) for printing one page on a recording sheet to monochrome printing, double-sided printing, and N in one (N-up: N is two or more) for performing aggregating printing of a plurality of pages on a recording sheet, respectively.

For example, in the case of performing copying with an MFP (digital multi-functional peripheral) etc., provided with a printer function and a copying function, when a system manager etc., previously sets environmentally-friendly copying conditions such as N in one copying and double-sided copying as initial set values, it is possible to execute copying under the copying conditions of the initial set values unless a user intentionally changes the copying conditions in each copying. This makes it possible to perform ecology-printing relatively easily.

However, in the case where printing data is transmitted from a PC (personal computer) etc., used by a user to an MFP to perform printing with the MFP, a setting of printing conditions of a printer driver installed on the PC needs to be changed to conditions of ecology-printing, while in the case where a plurality of PCs are connected to the MFP through a network, printing conditions of a printer driver in each of the plurality of PCs need to be changed, thus posing a problem of taking labor in changing processing.

Moreover, since installation of a printer driver on a PC is performed by a user as needed, even a manager of the MFP is hard to recognize all PCs on which the printer driver is installed, thus making it difficult to change printing conditions of the printer driver of all PCs to ecology-printing.

Against this, for example, Japanese Laid-Open Patent Publication No. 2005-332100 describes a print setting sharing support apparatus in which initial set values of a printer driver whose printing conditions have been previously set by a manager etc., are able to be downloaded with a Web function and incorporated in the printer driver, enabling to share the printing conditions of the printer driver among a plurality of PCs. Moreover, Japanese Laid-Open Patent Publication No. 2006-48433 describes a printer driver capable of setting initial set values of many users to conditions set by a manager after installation. According to this, when an installed printer driver is activated, if it is determined that the printer driver does not perform initialization set by the manager with a flag, it is configured so that an initializing file is obtained from a printer to perform initialization.

However, in the case of the technology described in Japanese Laid-Open Patent Publication No. 2005-332100 above, in order to obtain the initial set values (printing conditions) of the printer driver, it is required that the print setting sharing support apparatus is accessed from a PC of a user and a printing setting desired by the user is selected and downloaded from a plurality of printing settings registered in the print setting sharing support apparatus. Accordingly, since the printing setting to be downloaded is entrusted to the decision of the user, the printing setting of the printer driver is not able to be always shared among the plurality of PCs.

Moreover, in order to share the initial set values of the printer driver among the plurality of PCs, it is also considered to transmit the initial set values through a network, however, it is impossible to change the initial set values of the printer driver in the case of a PC which is not in an energized status or a notebook-sized PC which is carried out when going outside. Thus, there is a problem that the manager of the printer needs to transmit repeatedly until the initial set values are received by each of the PCs, taking excess labor.

Moreover, in the technology described in Japanese Laid-Open Patent Publication No. 2006-48433 above, the printer driver obtains the initializing file from the printer only when the installed printer driver is activated for the first time, and update of the initializing file is not executed once the initializing file has been obtained. For example, in the case where the manager changes the printing conditions for ecology-printing or changes an option (hardware) configuration such as a double-sided printing mechanism and a large capacity cassette (LCC), the initial set values of the printer driver stored in the printer are changed. In addition, each of the PCs needs to change the initial set values of the own printer driver accordingly, however, there is a problem that it is impossible to reflect this change after the initializing file has been obtained as described above.

SUMMARY OF THE INVENTION

An object of the present invention is to provide a printer driver in which update initial set values set by a manager are able to be obtained each time the printer driver is activated and changing of a setting such as changing of printing conditions due to ecology-printing etc., and changing of an option configuration such as a large capacity cassette is able to be reflected promptly and reliably, a recording medium, an information processing apparatus, a printing system, and a printer driver setting method.

Another object of the present invention is to provide a printer driver capable of being installed on an information processing apparatus, the printer driver comprising an access portion which accesses an external storage apparatus storing initial set values of the printer driver in each activation; a set value comparing portion which compares initial set values set to the printer driver and initial set values stored in the external storage apparatus; and a set value selecting portion which selects either initial set values of the printer driver or initial set values stored in the external storage apparatus based on a comparison result.

Another object of the present invention is to provide the printer driver, wherein as a result of comparison of initial set values set to the printer driver and initial set values stored in the external storage apparatus, when initial set values of at least one item are different, the set value selecting portion selects the initial set values stored in the external storage apparatus for the item.

Another object of the present invention is to provide the printer driver, wherein as a result of comparison of initial set values set to the printer driver and initial set values stored in the external storage apparatus, when initial set values of at least one item are different, the set value selecting portion selects initial set values having a higher energy saving effect among an initial set value of the printer driver and an initial set value stored in the external storage apparatus for the item.

Another object of the present invention is to provide the printer driver, wherein when initial set values of at least one item of the printer driver are updated to initial set values stored in the external storage apparatus, a message for notifying a user of that effect is able to be displayed on a display portion of the information processing apparatus.

Another object of the present invention is to provide the printer driver, wherein as a result of comparison of initial set values set to the printer driver and initial set values stored in the external storage apparatus, when initial set values of at least one item are different, the set value selecting portion is able to display a selecting screen for causing a user to select either initial set values of the printer driver or initial set values stored in the external storage apparatus for the item on the display portion of the information processing apparatus.

Another object of the present invention is to provide the printer driver, wherein whether or not to perform update to initial set values stored in the external storage apparatus is able to be selected by a user on the selecting screen, and when update of initial set values is not selected by the user, display of the selecting screen is not performed until update date and time or version information of initial set values stored in the external storage apparatus is updated.

Another object of the present invention is to provide the printer driver, wherein when initial set values stored in the external storage apparatus is selected by the set value selecting portion, initial set values set to the printer driver is updated by the selected initial set values.

Another object of the present invention is to provide the printer driver, wherein the set value comparing portion compares update date and time of initial set values set to the printer driver and update date and time of initial set values stored in the external storage apparatus to thereby judge whether or not initial set values of at least one item are different.

Another object of the present invention is to provide the printer driver as defined, wherein the set value comparing portion compares version information of initial set values set to the printer driver and version information of initial set values stored in the external storage apparatus to thereby judge whether or not initial set values of at least one item are different.

Another object of the present invention is to provide the printer driver, wherein when a printing icon of an application provided in the information processing apparatus is selected and instructed by a user, the access portion temporarily holds the selected and instructed printing job and thereafter accesses the external storage apparatus.

Another object of the present invention is to provide a computer-readable recording medium having the printer driver recorded therein.

Another object of the present invention is to provide an information processing apparatus having the printer driver installed thereon.

Another object of the present invention is to provide a printing system in which an information processing apparatus having a printer driver installed thereon and an external storage apparatus which stores initial set values of the printer driver are connected through a network, wherein the information processing apparatus includes an access portion which accesses the external storage apparatus each time the printer driver is activated, a set value comparing portion which compares initial set values set to the printer driver and initial set values stored in the external storage apparatus, and a set value selecting portion which selects either initial set values of the printer driver or initial set values stored in the external storage apparatus based on a comparison result.

Another object of the present invention is to provide a printing system in which an information processing apparatus having a printer driver installed thereon and an external storage apparatus which stores initial set values of the printer driver are connected through a network, wherein the information processing apparatus includes a version information transmitting portion which transmits version information of initial set values set to the printer driver to the external storage apparatus each time the printer driver is activated, the external storage apparatus includes an initial set value extracting portion which compares version information transmitted from the information processing apparatus and version information stored in the external storage apparatus, and when version information is different, extracts updated initial set values from initial set values stored in the external storage apparatus, and an initial set value transmitting portion which transmits the extracted initial set values to the information processing apparatus, and the information processing apparatus is able to set the initial set values transmitted from the external storage apparatus as initial set values of the printer driver.

Another object of the present invention is to provide the printing system, wherein the external storage apparatus is a printing apparatus or a server apparatus.

Another object of the present invention is to provide a printer driver setting method by a printing system in which an information processing apparatus having a printer driver installed thereon and an external storage apparatus which stores initial set values of the printer driver are connected through a network, wherein the information processing apparatus includes a step of accessing the external storage apparatus each time the printer driver is activated, a set value comparing step of comparing initial set values set to the printer driver and initial set values stored in the external storage apparatus, and a set value selecting step of selecting either initial set values of the printer driver or initial set values stored in the external storage apparatus based on a comparison result.

Another object of the present invention is to provide a printer driver setting method by a printing system in which an information processing apparatus having a printer driver installed thereon and an external storage apparatus which stores initial set values of the printer driver are connected through a network, wherein the information processing apparatus includes a version information transmitting step of transmitting version information of initial set values set to the printer driver to the external storage apparatus each time the printer driver is activated, the external storage apparatus includes an initial set value extracting step of comparing version information transmitted from the information processing apparatus and version information stored in the external storage apparatus, and when version information is different, extracting updated initial set values from initial set values stored in the external storage apparatus, and an initial set value transmitting step of transmitting the extracted initial set values to the information processing apparatus, and the information processing apparatus is able to set the initial set values transmitted from the external storage apparatus as initial set values of the printer driver.

BRIEF DESCRIPTION OF THE DRAWINGS

FIG. 3 is a view showing an example of an initial set value list table stored in the MFP;

FIG. 4 is a view showing an example of an initial set value priority order table;

PREFERRED EMBODIMENTS OF THE INVENTION

Now, referring to the accompanying drawings, preferred embodiments of a printer driver, a recording medium, an information processing apparatus, a printing system, and a printer driver setting method of the present invention will hereinafter be described.

Figure 1:
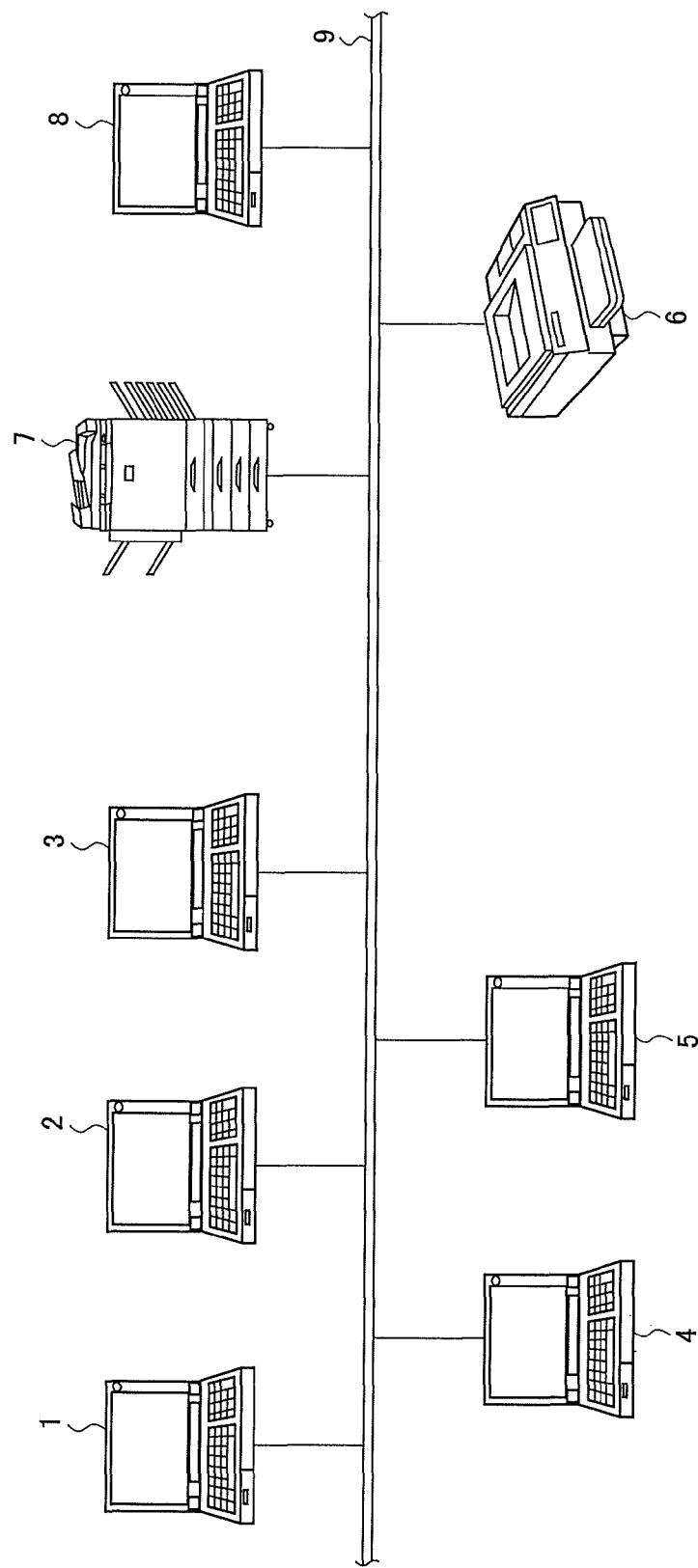
FIG. 1 is a view showing an exemplary configuration of a printing system according to an embodiment of the present invention.

FIG. 1 is a view showing an exemplary configuration of a printing system according to an embodiment of the present invention, where 1 to 5 denote client PCs (personal computers) as an example of an information processing apparatus, 6 denotes a printer, 7 denotes a digital multi-functional peripheral (hereinafter referred to as an MFP), 8 denotes a manager PC, and 9 denotes a network such as a LAN (Local Area Network). The client PCs 1 to 5, the manager PC 8, the printer 6, and the MFP 7 are connected to each other through the network 9, and the printer 6 and the MFP 7 execute printing based on a printing instruction from the client PCs 1 to 5 or the manager PC 8.

Each of the client PCs 1 to 5 and the manager PC 8 is comprised of a versatile computer and a printer driver which is necessary to perform printing in the printer 6 or the MFP 7 is previously installed thereon. Initial set values serving as default are set to the printer driver, and when performing printing from the client PCs 1 to 5, a user is able to perform printing by using the initial set values of the printer driver as they are or changing the initial set values in accordance with printing conditions.

The printer 6 or the MFP 7 is an example of an external storage apparatus and stores initial set values of the printer driver. The manager PC 8 is able to access the printer 6 or the MFP 7 by manager authority and update initial set values of each printer driver. Note that, the initial set values herein refer to default set values.

Figure 2:
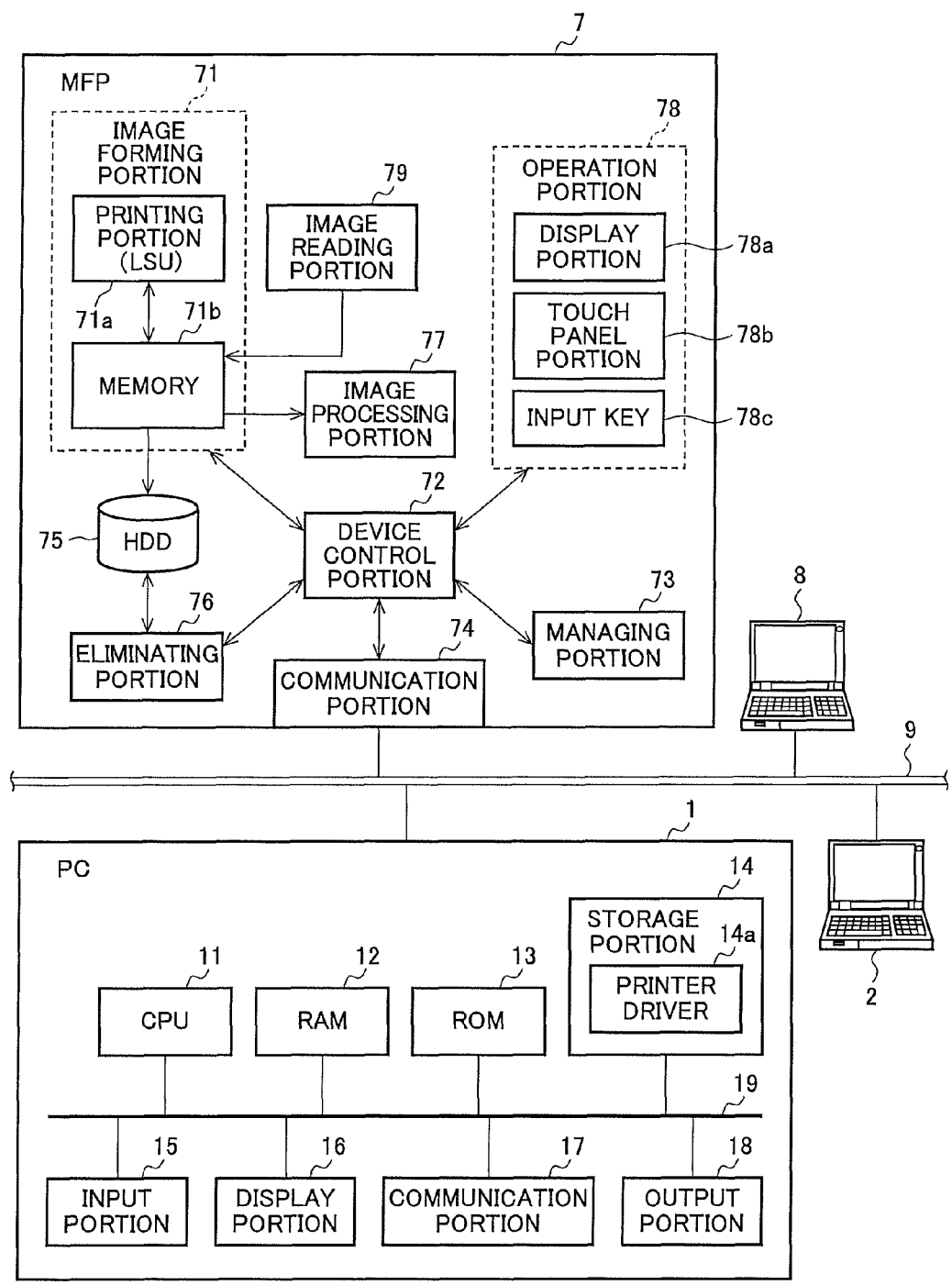
FIG. 2 is a block diagram showing an exemplary configuration of a client PC and an MFP shown in FIG. 1.

FIG. 2 is a block diagram showing an exemplary configuration of the client PC and the MFP shown in FIG. 1. Here, although description will be given with the configuration of the client PC 1 as a representative example, other client PCs 2 to 5 and the manager PC 8 also have the same configuration basically. Moreover, although description will be given by exemplarily illustrating the MFP 7 as an example of an external storage apparatus, without limitation to this example, the external storage apparatus may be a single-function printer 6 (FIG. 1) which stores initial set values of a printer driver or a server apparatus (not shown) which stores initial set values of a printer driver.

The MFP 7 is configured as a multi-functional peripheral provided with a plurality of functions such as a printer function, a copying function, a facsimile function, and a scanner function. The MFP 7 is provided with an image forming portion 71 which performs printing processing of data, a device control portion 72 which controls each of the functions provided in the MFP 7, a managing portion 73 which is a memory storing control information and setting information etc., of the MFP 7, a communication portion 74 which communicates with the client PCs 1 to 5 and the manager PC 8 through the network 9, an HDD (hard disc drive) 75 which stores data, an eliminating portion 76 which eliminates data stored in the HDD 75, an image processing portion 77 which applies various kinds of image processing to data, and an operation portion 78 which receives operation input by a user.

Moreover, the image forming portion 71 is provided with a printing portion 71a such as an LSU (laser scanning unit) and a volatile memory 71b which temporarily holds data subjected to image processing by the image processing portion 77.

Moreover, the operation portion 78 is provided with a display portion 78a such as an LCD (liquid crystal display), a touch panel portion 78b which receives operation input by the user through a touch panel, and an input key 78c which is comprised of an input key group such as various kinds of operating keys and a numerical keypad, and the user is able to perform inputting of an operation or inputting of various kinds of settings to the MFP 7 by operating the operation portion 78.

When the MFP 7 according to the present embodiment is used as a printer, data received from the communication portion 74 is output from the image forming portion 71 through the volatile memory 71b etc. That is, the communication portion 74 is connected to the network 9 by wire or wireless and receives data from the client PC 1 and the manager PC 8 which are external devices connected on the network 9. The data received in this way is transmitted to the volatile memory 71b in the unit of a page as data to be output and temporarily stored in the HDD 75 as necessary. Then, the data is transmitted again from the HDD 75 to the volatile memory 71b and transferred to the printing portion 71a.

Each constituent portion of the MFP 7 according to the present embodiment is controlled by the device control portion 72, monitors an operation instruction from the input key 78c such as the input key group provided in the operation portion 78, and guides and displays information to be notified to the user, such as information of the status of the MFP 7, through the display portion 78a accurately. Moreover, information of each constituent portion controlled by the device control portion 72 is managed in the managing portion 73, and based on the information, the device control portion 72 controls the operation of the entire MFP 7.

In FIG. 2, the client PC 1 is comprised of, for example, a versatile computer and is comprised of a CPU 11 which controls an operation of the client PC 1, a RAM 12 which serves as an execution area of a control program etc., a ROM 13 which stores a control program and data etc., a storage portion 14 which is comprised of an HDD etc., an input portion 15 which is comprised of pointing devices such as a mouse and a keyboard, a display portion 16 such as an LCD, a communication portion 17 which is a communication interface connected to the network 9, an output portion 18 which outputs data to an external device such as a printer, and a system bus 19 which connects these portions to each other. A printer driver 14a which is necessary to execute printing in the MFP 7 is stored, for example, in the storage portion 14 and read out by the CPU 11 to the RAM 12 to be executed at the time of executing printing.

The main characteristic portion of the present invention is that update initial set values set by a manager are able to be obtained each time a printer driver is activated and changing of a setting such as changing of printing conditions due to ecology-printing etc., and changing of an option configuration such as a large capacity cassette is able to be reflected promptly and reliably. For this configuration, the printer driver 14a is provided with an access portion which accesses the MFP 7 in each activation, a set value comparing portion which compares initial set values set to the printer driver 14a and initial set values stored in the MFP 7, and a set value selecting portion which selects either initial set values of the printer driver 14a or initial set values of the MFP 7 based on the comparison result. The access portion, the set value comparing portion, and the set value selecting portion are realized as a part of functions provided in the printer driver 14a, and the printer driver 14a is configured to be installed so as to be executable by the client PC 1.

FIG. 3 is a view showing an example of an initial set value list table stored in the MFP 7. In this example, the MFP 7 stores update initial set values set by a manager for items such as the number of copies, single-sided/double-sided printing, N-up printing (aggregating printing), a color mode, and a sheet size. Considered as an example of processing for updating initial set values stored in the MFP 7 is, for example, a method in which a specific user such as a manager activates a printer driver of the MFP 7 by the manager PC 8, inputs initial set values which are desirably set to each of client PCs used by other users, and transmits the initial set values to the MFP 7 through the network 9. In the MFP 7, the initial set values received from the manager PC 8 through the communication portion 74 and the device control portion 72 are stored in the memory 71b or the HDD 75. In this way, the manager is able to update printing conditions which are desirably used commonly in a plurality of client PCs constituting a printing system at an arbitrary timing.

Initial set values are set as default to the printer driver 14a of each client PC 1. In addition, similarly to the MFP 7, the printer driver 14a or the client PC 1 on which the printer driver 14a is installed is able to store the initial set value list table as shown in FIG. 3. Thereby, by comparing the initial set values of the MFP 7 and the initial set values of the printer driver 14a for each item included in the initial set value list table, whether or not both of them are different is able to be judged.

Moreover, as another method for judging whether or not the initial set values are different, update date and time of the initial set values set to the printer driver 14a and update date and time of the initial set values stored in the MFP 7 may be compared, or each version information may be compared. When initial set values of at least one item is updated by the manager, update date and time and version information are updated, thus making it possible to easily judge a difference between the initial set values by comparison thereof. Note that, if it is judged that the initial set values are different based on update date and time or version information, it is necessary to specify which item of the initial set values has been changed. As a method therefor, in the case where, for example, update history such as "x (date) x (month) (or version xx), item "xx" updated" is held together with update date and time and version information, this update history enables to specify which item has been changed.

Description will be given for a first embodiment according to a method for setting the printer driver 14a. For example, a user activates the printer driver 14a of the client PC 1 when giving a printing instruction to the MFP 7. The activated printer driver 14a accesses the MFP 7, and as a result of comparison of initial set values set to the printer driver 14a and initial set values stored in the MFP 7, when initial set values of at least one item are different, selects the initial set value of the MFP 7 for the item. Then, the initial set value of the printer driver 14a is automatically updated by the selected initial set value. For example, when the initial set value of the MFP 7 is "two-up" and the initial set values of the printer driver 14a is "one-up" for the item of N-up printing, the initial set value of the printer driver 14a is automatically updated to the initial set value of the MFP 7 since both of them are different. Note that, when there are a plurality of items whose initial set values are different, all the different initial set values are updated.

Here, description will be given for the case where an option configuration such as a double-sided printing mechanism or a large capacity cassette is newly added. The printer driver 14a, in a status where an option is not mounted on the MFP 7, sets an item corresponding to the option to an unsettable status by displaying in a gray-out manner, for example. However, when the option is added to the MFP 7 as described above and a manager updates the initial set values of the MFP 7, in accordance therewith, the printer driver 14a of each client PC also sets an item corresponding to the option to a settable status and performs update.

Moreover, as a second embodiment according to the method for setting the printer driver 14a, the printer driver 14a accesses the MFP 7, and as a result of comparison of initial set values set to the printer driver 14a and initial set values stored in the MFP 7, when initial set values of at least one item are different, may select initial set value having a higher energy saving effect among an initial set value of the printer driver 14a and an initial set value of the MFP 7 for the item. For example, the printer driver 14a or the client PC 1 on which the printer driver 14*a* is installed stores an initial set value priority order table as shown in FIG. 4.

The initial set value priority order table is one in which initial set values are arranged in an order from less used amount of recording sheets and/or toner (that is, in an order from a higher energy saving effect) for each item. For example, in the N-up printing, since the larger the N is, the less the used amount of recording sheets and toner is, it is able to be said that the setting is environmentally-friendly and has a higher energy saving effect. Similarly, as for single-sided/double-sided printing, the used amount of recording sheets is less for the double-sided printing. Moreover, as for a color mode, monochrome printing does not use color toner and is able to be said as having a higher energy saving effect. The initial set value priority order table is referred to by the printer driver 14*a*.

For example, when initial set value of the MFP 7 is "four-up" and the initial set value of the printer driver 14*a* is "one-up" for the item of N-up printing, the printer driver 14*a* refers to the initial set value priority order table of FIG. 4 and selects the initial set values of the MFP 7 "four-up" which is a more environmentally-friendly setting, to set to the printer driver 14*a*. Alternatively, on the contrary, when initial set value of the MFP 7 is "one-up", and the initial set value of the printer driver 14*a* is "four-up", the initial set value priority order table of FIG. 4 is referred to, and the initial set values of the printer driver 14*a* "four-up" which is a more environmentally-friendly setting is selected. In this case, the initial set value of the printer driver 14*a* "four-up" is originally set, and therefore used as it is.

In the first and second embodiments above, the printer driver 14*a* may display a message for notifying a user of that the initial set values of the printer driver 14*a* are updated on the display portion 16 of the client PC 1 and cause the user to confirm whether or not printing may be continued as it is. For example, it is inconvenient in some cases for a user who desires to perform color printing of a graphic-related document etc., if initial set values are updated to monochrome printing. In such a case, the user finds that a setting is changed from color printing to monochrome printing by the message above, and when it is inconvenient, may return the setting to the original color printing.

Moreover, as a third embodiment according to the method for setting the printer driver 14*a*, the printer driver 14*a* accesses the MFP 7, and as a result of comparison of initial set values set to the printer driver 14*a* and initial set values stored in the MFP 7, when initial set values of at least one item are different, may display a selecting screen for causing a user to select either initial set values of the printer driver 14*a* or initial set values of the MFP 7 for the item on the display portion 16 of the client PC 1. An example of the selecting screen will be shown in FIGS. 8 and 9, which will be described below.

The third embodiment is one in which a confirmation of update is performed by the selecting screen at the time point before the initial set values of the printer driver 14*a* are updated. As described above, for example, since it is inconvenient for a user who desires to perform color printing of a graphic-related document etc., if initial set values are updated to monochrome printing, the user may select the initial set value of the MFP 7 for an item which may be updated or may select the initial set value of the printer driver 14*a* for an item which is not desired to be updated on the selecting screen.

In this way, since update initial set values set by a manager are able to be obtained from the MFP or the server apparatus when performing printing for all client PCs constituting a printing system, for example, changing of a setting to ecology-printing (monochrome printing, N-up printing, double-sided printing, toner saving printing etc.,) and changing of a setting of an option configuration such as a double-sided printing mechanism and a large capacity cassette are able to be reflected promptly and reliably.

Figure 5:
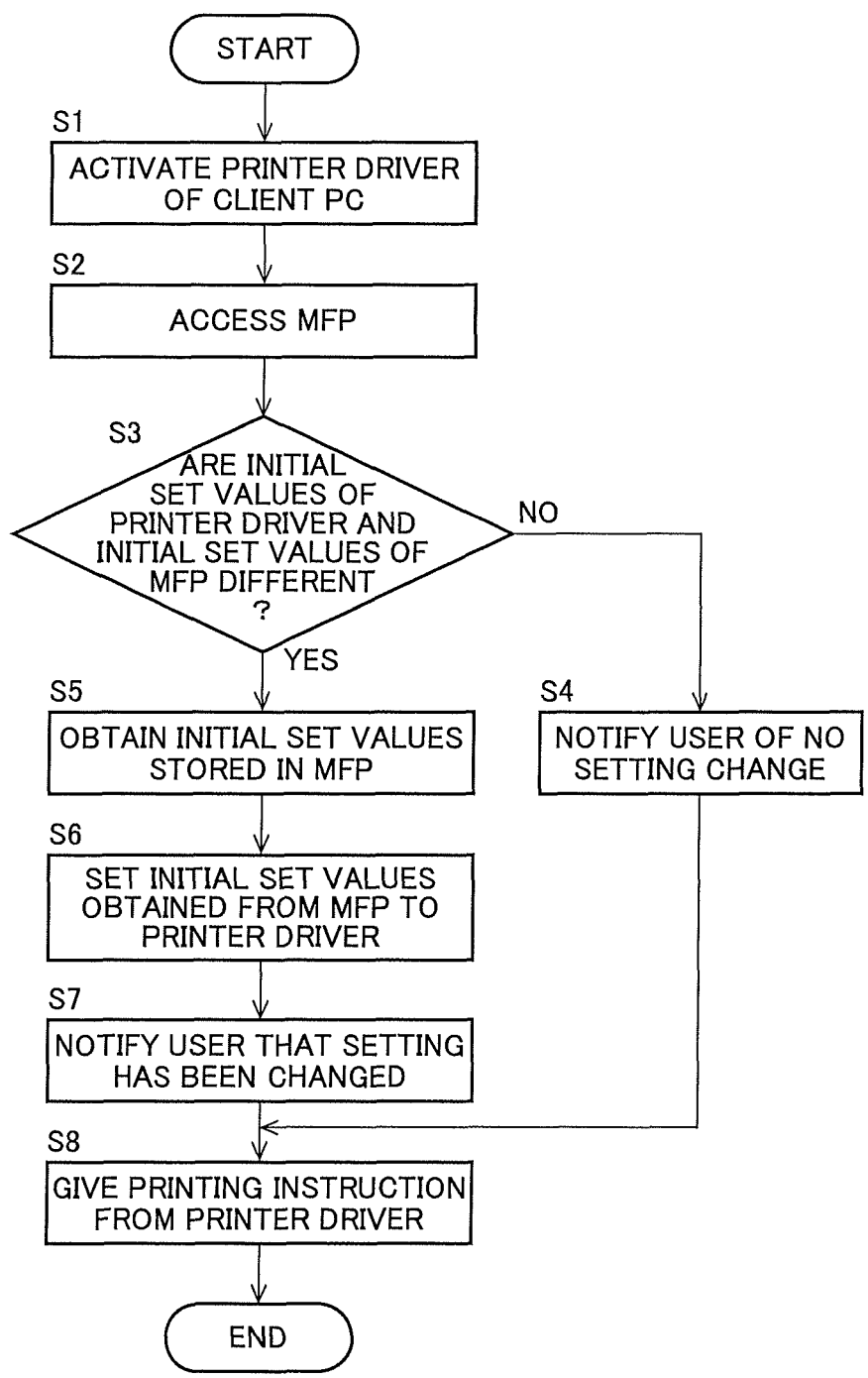
FIG. 5 is a flowchart for explaining an example of a printer driver setting method according to the present invention.

FIG. 5 is a flowchart for explaining an example of the method for setting the printer driver 14*a* according to the present invention. Note that, in flowcharts of FIGS. 5, 7, and 10, it is configured that a specific user such as a manager activates a printer driver of the MFP 7 by the manager PC 8, inputs initial set values and transmits the initial set values to the MFP 7 through the network 9, and thereby initial set values of the MFP 7 are updated at an arbitrary timing.

Figure 6:
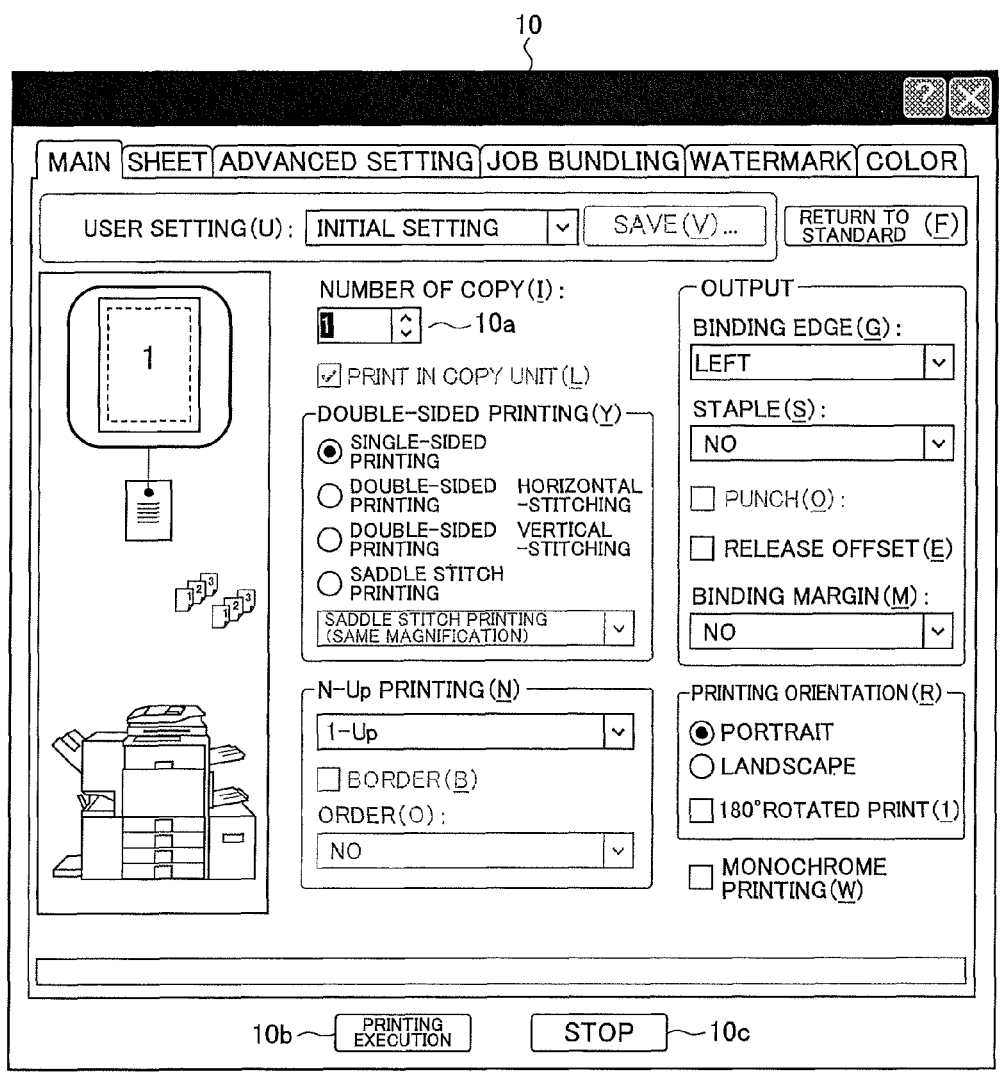
FIG. 6 is a view showing an example of a printing condition setting screen of a printer driver.

First, when a user gives a printing instruction to the MFP 7 from the client PC 1, the printer driver 14*a* is activated, and a printing condition setting screen of the printer driver 14*a* shown in FIG. 6 is displayed on the display portion 16 of the client PC 1 (step S1).

FIG. 6 is a view showing an example of the printing condition setting screen of the printer driver 14*a*, where 10 denotes the printing condition setting screen. On the printing condition setting screen 10, initial set values 10*a* set to the printer driver 14*a*, a printing execution button 10*b* for instructing the MFP 7 to execute printing, and a stop button 10*c* for stopping printing processing are displayed so as to be selectable. The user sets desired printing conditions on the printing condition setting screen 10 and depresses the printing execution button 10*b* finally, and is thereby able to cause the MFP 7 to execute printing.

In FIG. 5, the activated printer driver 14*a* displays the printing condition setting screen 10 of FIG. 6 and accesses the MFP 7 (step S2), and judges whether or not the initial set values of the printer driver 14*a* and the initial set values of the MFP 7 are different (step S3).

In the processing of step S3 above, as described above, it may be judged by comparing the initial set values of the MFP 7 and the initial set values of the printer driver 14*a* for each item included in the initial set value list table shown in FIG. 3. Moreover, update date and time of the initial set values set to the printer driver 14*a* and update date and time of the initial set values stored in the MFP 7 may be compared, or each version information may be compared. In this case, for example, update history enables to specify an item in which an initial set value is updated.

The printer driver 14*a*, in the case of judging that all initial set values are same at step S3 (in the case of NO), notifies a user that changing of a setting is not performed (step S4), and the flow goes to step S8. Alternatively, when it is judged that initial set values of at least one item are different at step S3 (in the case of YES), the initial set value stored in the MFP 7 for the different item is selected, which is obtained from the MFP 7 (step S5).

Then, the printer driver 14*a* sets the initial set value obtained from the MFP 7 to the printer driver 14*a* (step S6), and notifies the user that the setting has been changed (step S7). Note that, at step S6, when the initial set value obtained from the MFP 7 is set to the printer driver 14*a*, initial set value of the corresponding item of the printing condition setting screen 10 shown in FIG. 6 are automatically changed. Then, the user confirms whether or not the set values after the change of a setting poses a problem, and if there is a problem, makes an adjustment as appropriate. Finally, when the user depresses the "printing execution" button of the printing condition setting screen 10 of FIG. 6, a printing instruction according to the printing conditions set as above is transmitted from the client PC 1 to the MFP 7 (step S8).

Figure 7:
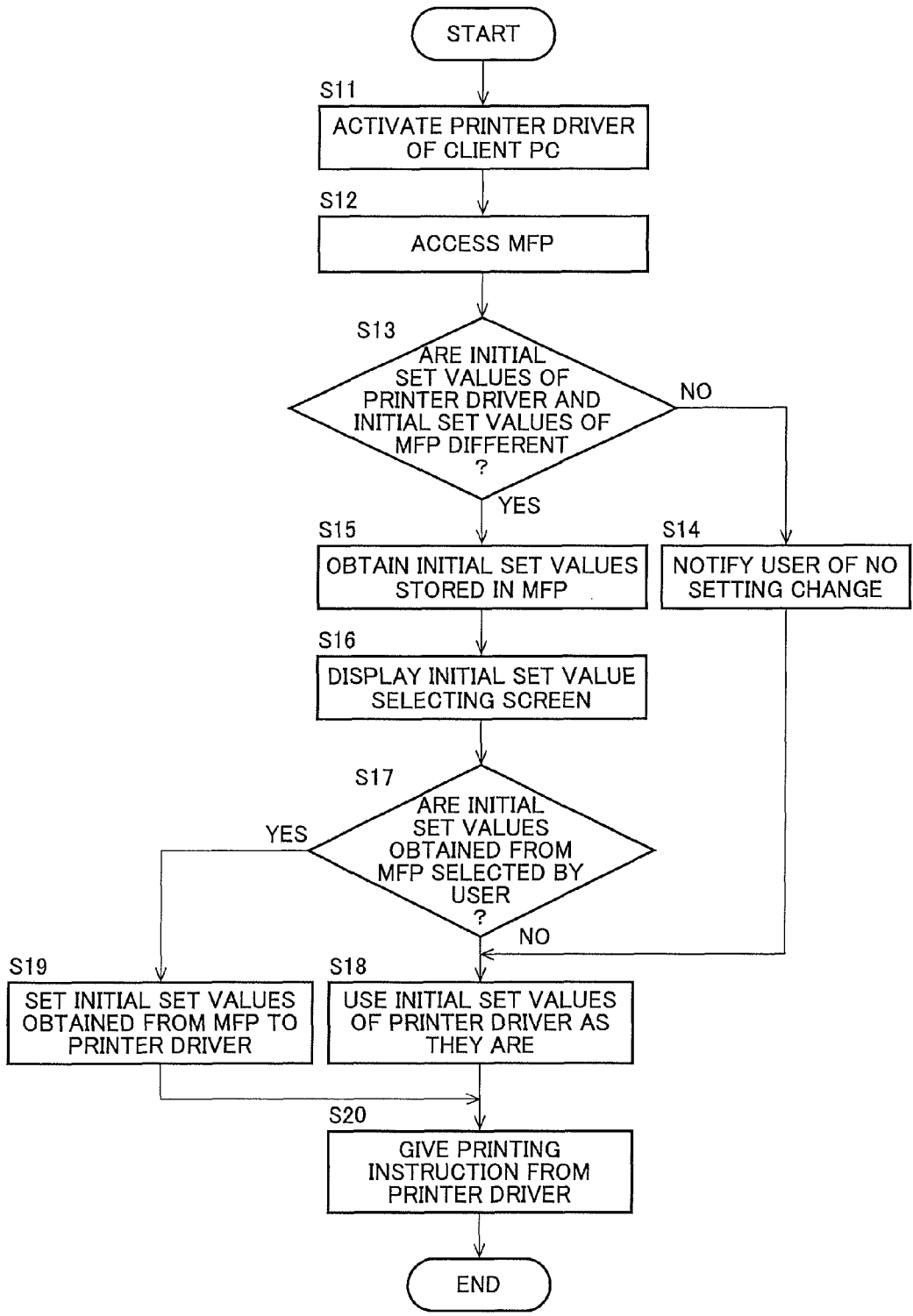
FIG. 7 is a flowchart for explaining another example of the printer driver setting method according to the present invention.

FIG. 7 is a flowchart for explaining another example of the method for setting the printer driver 14*a* according to the present invention. Processing from steps S11 to S15 are same as processing from steps S1 to S5 of FIG. 5 described above. That is, when the user gives a printing instruction from the client PC 1 to the MFP 7, the printer driver 14a is activated, and the printing condition setting screen 10 shown in FIG. 6 is displayed (step S11). Then, the activated printer driver 14a accesses the MFP 7 (step S12), and judges whether or not the initial set values of the printer driver 14a and the initial set values of the MFP 7 are different (step S13).

Next, the printer driver 14a, in the case of judging that all initial values are same at step S13 (in the case of NO), notifies a user that changing of a setting is not performed (step S14), and the flow goes to step S18. Alternatively, when it is judged that initial set values of at least one item are different at step S13 (in the case of YES), the initial set value stored in the MFP 7 for the different item is selected, which is obtained from the MFP 7 (step S15).

Subsequently, the printer driver 14a displays an initial set value selecting screen shown in FIG. 8 or 9 on the display portion 16 of the client PC 1 (step S16). The user confirms whether the initial set values obtained from the MFP 7 (in this example, two items including double-sided printing and N-up printing are different) are all right on the initial set value selecting screen of FIG. 8 or 9, and if there is a problem, makes an adjustment on the selecting screen.

Figure 8:
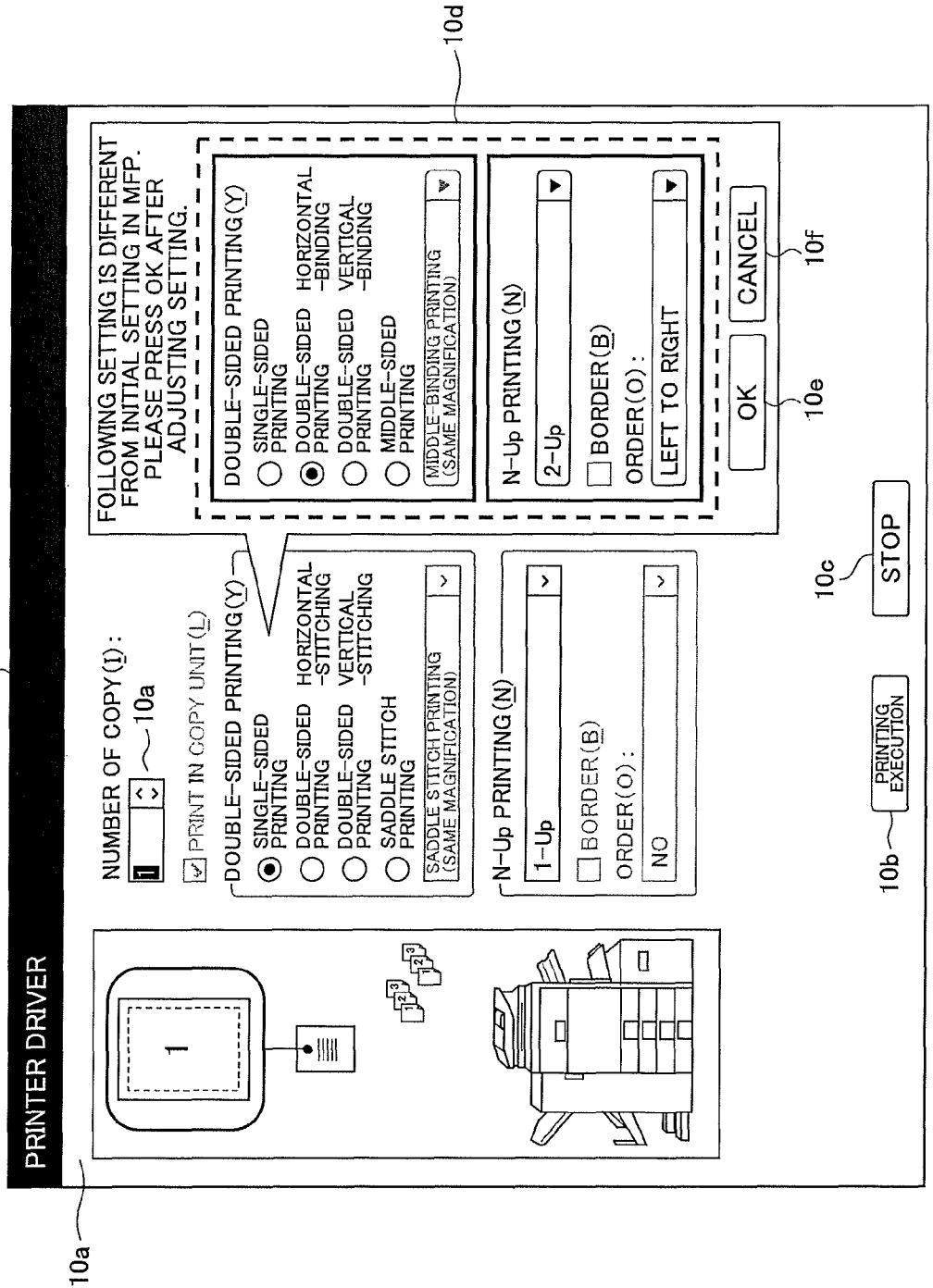
FIG. 8 is a view showing an example of an initial set value selecting screen displayed on a display portion of a client PC.

FIG. 8 is a view showing an example of the initial set value selecting screen displayed on the display portion 16 of the client PC 1, where 10' denotes an initial set value selecting screen. The initial set value selecting screen 10' is displayed in a status where initial set values 10d obtained from the MFP 7 are superimposed on the printing condition setting screen 10 shown in FIG. 6. The initial set value selecting screen 10' displays the initial set values 10a set to the printer driver 14a and the initial set values 10d obtained from the MFP 7 side-by-side as shown in FIG. 8, thereby enabling the user to easily recognize changed points. Further, highlighting the changed points by coloring etc., enables visibility of the user to be improved.

The initial set values 10d are one in which initial set values updated in the MFP 7 (that is, initial set values which are different from the initial set values of the printer driver 14a) are collected, and if there is a problem with a content thereof, the user adjusts the initial set values 10d as appropriate on the initial set value selecting screen 10', and finally depresses an "OK" button 10e. Thereby, the initial set values 10d are fixed, and the fixed initial set values 10d are reflected on the initial set values 10a of the printer driver 14a. Moreover, when a "cancel" button 10f is depressed, update to the initial set values 10d obtained from the MFP 7 is not executed, and the initial set values 10a of the printer driver 14a are used as they are.

Figure 9:
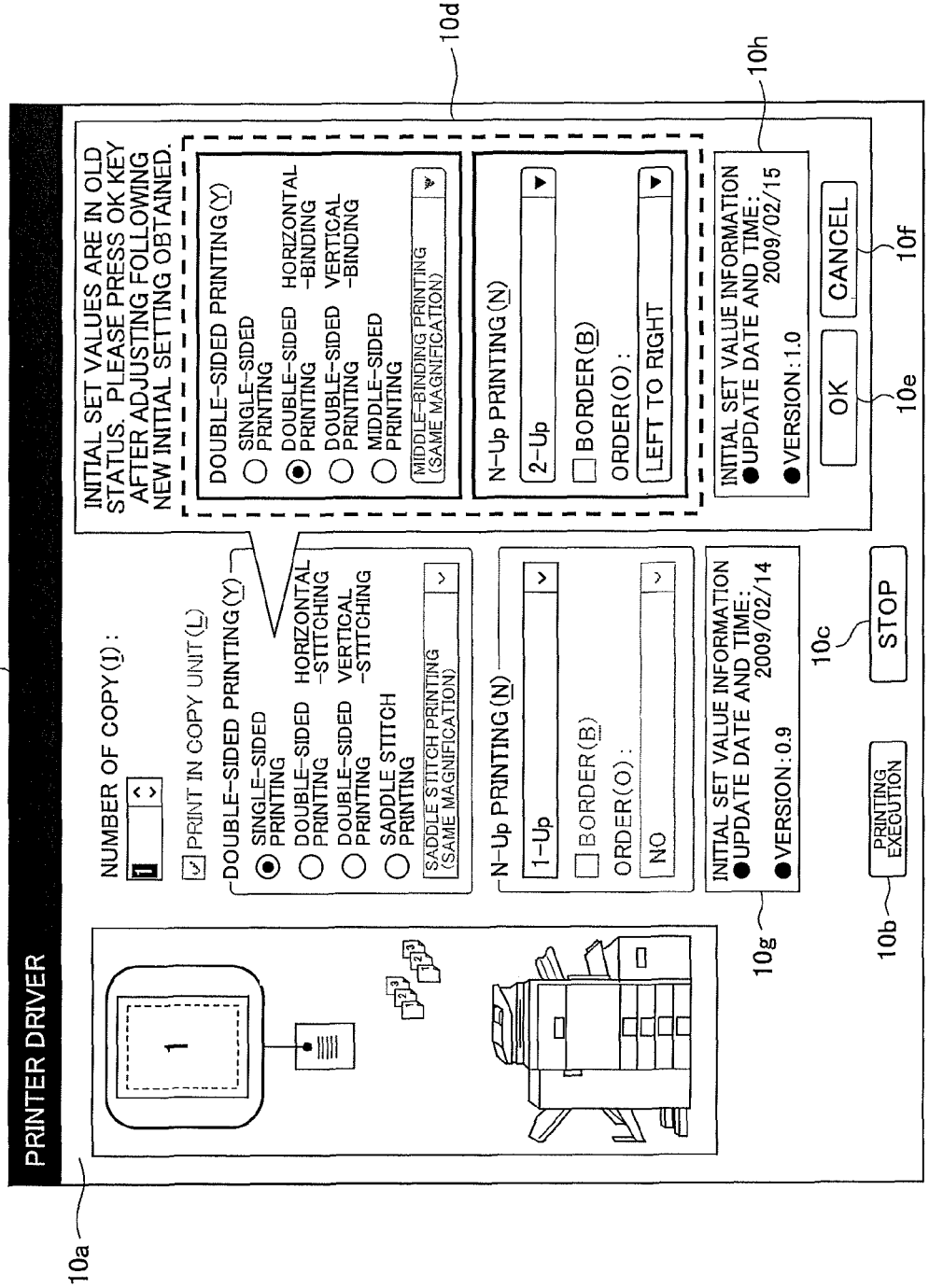
FIG. 9 is a view showing another example of the initial set value selecting screen displayed on the display portion of the client PC.

FIG. 9 is a view showing another example of the initial set value selecting screen displayed on the display portion 16 of the client PC 1. The initial set value selecting screen 10' is displayed in a status where initial set values 10d obtained from the MFP 7 are superimposed on the printing condition setting screen 10 shown in FIG. 6 similarly to the example of FIG. 8 above, however, a different point is that initial set value information 10g and 10h comprised of update date and time and version information are included in display fields of initial set values 10a and 10d. As described above, by comparing the update date and time and the version information, whether or not initial set values are different is able to be judged easily.

Here, for example, when a user depresses the "cancel" button 10f shown in FIG. 9, it is considered that there is no intention to update at least initial set values of a current version. In such a case, it is troublesome for the user to display the initial set value selecting screen 10' of the same content in each activation of the printer driver 14a. Then, as described above, whether or not to perform update to initial set values of the MFP 7 is able to be selected by a user on the initial set value selecting screen 10', and when update of initial set values is not selected by the user, that is, when the user depresses the "cancel" button 10f shown in FIG. 9, display of the initial set value selecting screen 10' may not be performed until version information of the initial set values of the MFP 7 is updated.

In the above, the printer driver 14a stores version information of initial set values which is stored in the MFP 7 currently and confirms version information of initial set values of the MFP 7 when the printer driver 14a is activated and accesses the MFP 7 from next time. In this case, when version information is not updated from the previous time, the initial set value selecting screen 10' of FIG. 9 is not displayed and initial set values set to the printer driver 14a are used as they are. Alternatively, when version information is updated from the previous time, the initial set value selecting screen 10' of FIG. 9 is displayed and whether or not to perform update to the initial set values is selected by the user. Note that, although version information is exemplarily illustrated here, the same processing is able to be performed even with update date and time.

In FIG. 7, the printer driver 14a judges whether or not initial set values obtained from the MFP 7 by the user is selected on the initial set value selecting screen 10' shown in FIG. 8 or 9 (step S17), and when the initial set values obtained from the MFP 7 are not selected, that is, when the "cancel" button 10f of FIG. 8 or 9 is depressed (in the case of NO), initial set values of the printer driver 14a are used as they are (step S18). Alternatively, at step S17, when the initial set values obtained from the MFP 7 are selected, that is, when the "OK" button 10e of FIG. 8 or 9 is depressed (in the case of YES), the initial set values obtained from the MFP 7 are set to the printer driver 14a (step S19).

Finally, when the user depresses the "printing execution" button 10b on the initial set value selecting screen 10' of FIG. 8 or 9, a printing instruction according to printing conditions set as above is transmitted from the client PC 1 to the MFP 7 (step S20).

Figure 10:
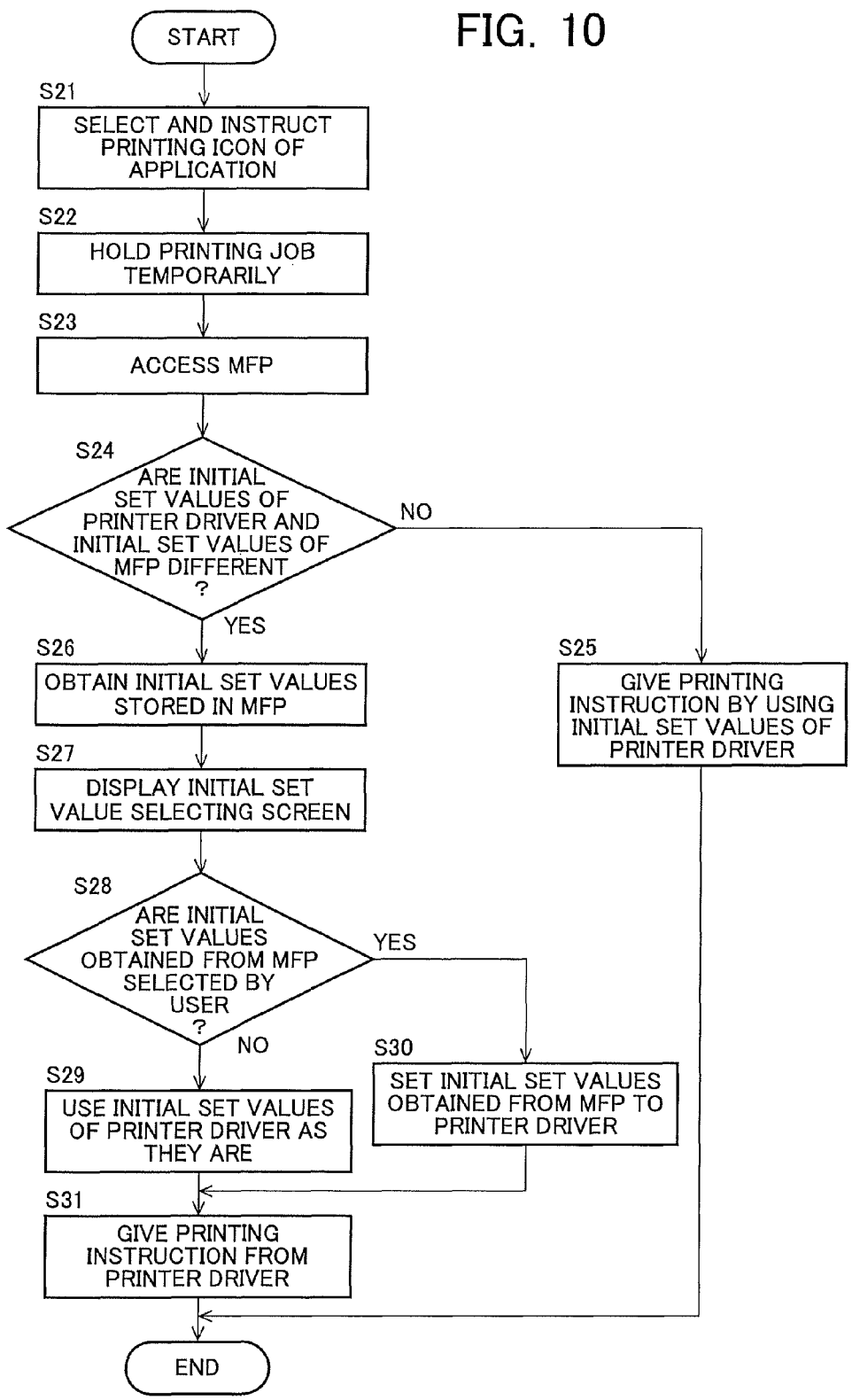
FIG. 10 is a flowchart for explaining another example of the printer driver setting method according to the present invention.

FIG. 10 is a flowchart for explaining another example of the method for setting the printer driver 14a according to the present invention. For example, a printing icon is displayed normally in applications such as word-processing software and spreadsheet software, however, when printing is performed from the printing icon, a printing instruction is transmitted to the MFP 7 without displaying the printing condition setting screen of the printer driver 14a (FIG. 6).

Accordingly, in the case of the printing instruction from the printing icon, a setting of printing conditions (initial set values) is not able to be changed. In order to solve such a problem, in this example, it is configured that when a printing icon of an application provided in the client PC 1 is selected and instructed by a user, the printer driver 14a temporarily holds the selected and instructed printing job and thereafter accesses the MFP 7.

In FIG. 10, first, when a printing icon of an application is selected and instructed by a user (step S21), the printer driver 14a temporarily holds the printing job in a storage portion etc., of the client PC 1 (step S22), and thereafter accesses the MFP 7 (step S23), and judges whether or not initial set values of the printer driver 14a and the initial set values of the MFP 7 are different (step S24).

Next, the printer driver 14a, in the case of judging all initial set values are same at step S24 (in the case of NO), uses the initial set values of the printer driver 14a, gives a printing instruction of the printing job which is being held (step S25), and finishes as it is. Alternatively, when it is judged that initial set values of at least one item are different at step S24 (in the case of YES), initial set value stored in the MFP 7 is selected for the different item, which is obtained from the MFP 7 (step S26).

Subsequently, the printer driver 14a displays the initial set value selecting screen shown in FIG. 8 or 9 on the display portion 16 of the client PC 1 (step S27). The user confirms whether the initial set value obtained from the MFP 7 is all right on the initial set value selecting screen of FIG. 8 or 9, and if there is a problem, makes an adjustment on the selecting screen.

Then, the printer driver 14a judges whether or not the initial set value obtained from the MFP 7 by the user is selected on the initial set value selecting screen 10' shown in FIG. 8 or 9 (step S28), and when the initial set value obtained from the MFP 7 is not selected, that is, the "cancel" button 10f of FIG. 8 or 9 is depressed (in the case of NO), initial set value of the printer driver 14a is used as it is (step S29). Alternatively, at step S28, when the initial set value obtained from the MFP 7 is selected, that is, the "OK" button 10e of FIG. 8 or 9 is depressed (in the case of YES), the initial set value obtained from the MFP 7 is set to the printer driver 14a (step S30).

Finally, when the user depresses the "printing execution" button 10b on the initial set value selecting screen 10' of FIG. 8 or 9, a printing instruction according to printing conditions set as above is transmitted from the client PC 1 to the MFP 7 (step S31).

In the descriptions above, the printer driver 14a accesses the MFP 7 and performs comparison processing of initial set values, however, the processing may be performed by the MFP 7 or a server apparatus (not shown). In this case, the client PC1 is provided with a version information transmitting portion which transmits version information of initial set values set to the printer driver 14a to the MFP 7 each time the printer driver 14a is activated. The version information transmitting portion is realized by the printer driver 14a which is installed on the client PC 1, the communication portion 17, and the CPU 11 in FIG. 2.

Moreover, the MFP 7 includes an initial set value extracting portion which compares version information transmitted from the client PC 1 and version information stored in the MFP 7, and when version information is different, extracts updated initial set values from initial set values stored in the MFP 7, and an initial set value transmitting portion which transmits the extracted initial set values to the client PC 1. The initial set value extracting portion and the initial set value transmitting portion are realized by the device control portion 72 and the communication portion 74 in FIG. 2. Note that, the extraction of updated initial set values is able to be performed by referring to update history corresponding to version information.

In addition, the client PC 1 is able to set the initial set values transmitted from the MFP 7 as initial set values of the printer driver 14a. In this case, as a method for selecting the initial set values set to the printer driver 14a or the initial set values transmitted from the MFP 7, as described above, the initial set values transmitted from the MFP 7 may be selected or initial set values having a higher energy saving effect may be selected. In this case, when it is not preferable if printing is executed with the selected initial set values, it may be configured so that a user is able to adjust to desired set values. Alternatively, it may also be configured so that the initial set value selecting screen as shown in FIG. 8 or 9 is displayed and any of the initial set values is selected by a user.

Figure 11:
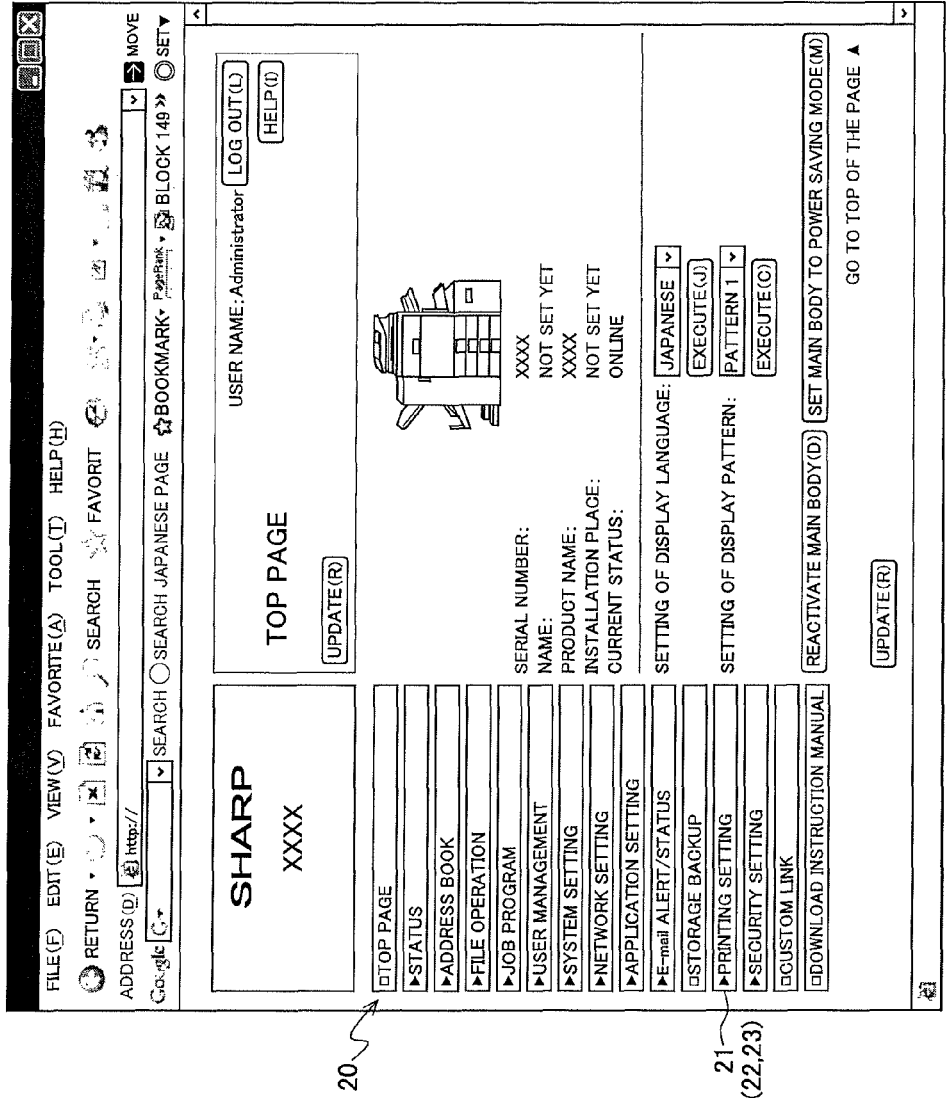
FIG. 11 is a view showing an example of a top page of a screen on which initial set values of the printer driver are set to the MFP from a manager PC.
Figure 12:
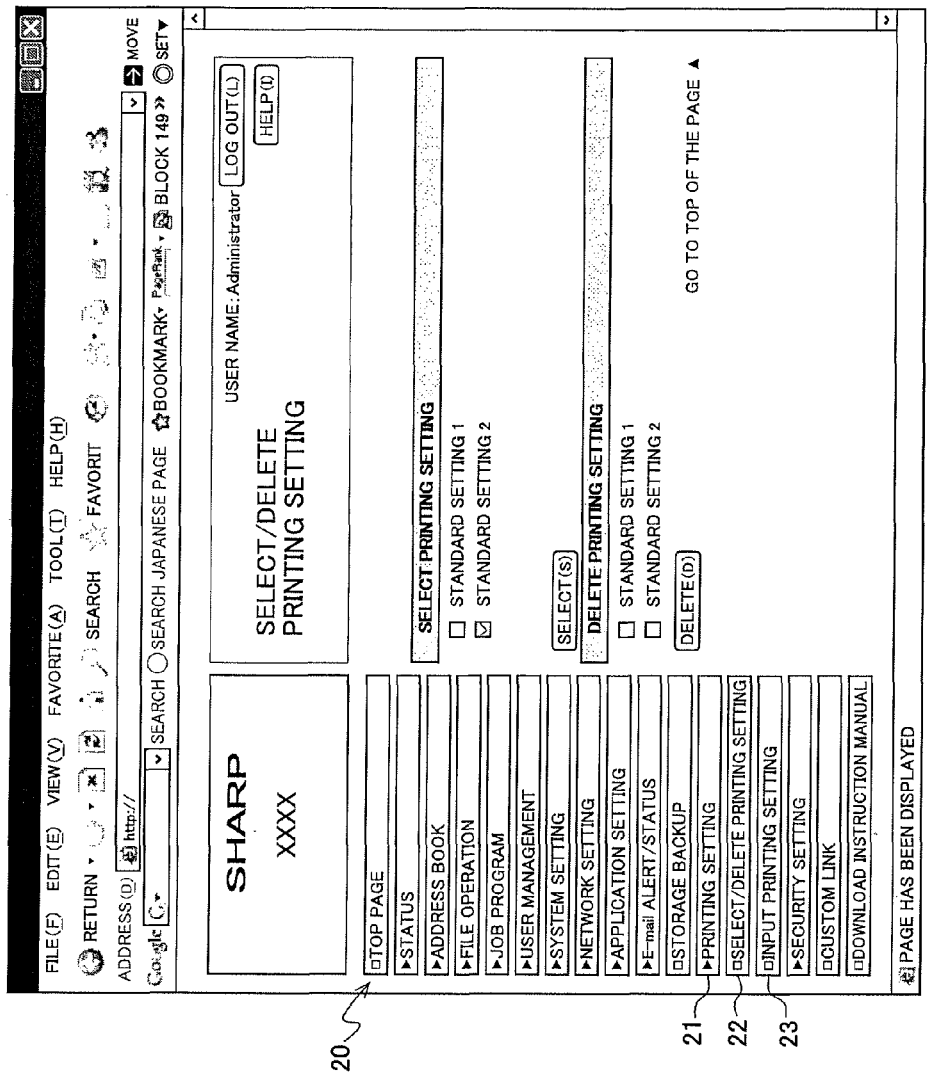
FIG. 12 is a view showing an example of a printing setting/release page.

FIG. 11 is a view showing an example of a top page of a screen on which initial set values of the printer driver are set to the MFP 7 from the manager PC 8. The manager accesses and logs into the MFP 7 through internet etc., from the manager PC 8 by manager authority to display the top page. A selection menu 20 is included in the top page and a printing setting 21 is included in one of items of the selection menu 20. Further, below the printing setting 21, select/release printing setting 22, and input printing setting 23 shown in FIG. 12 are hierarchized. When the user selects and instructs the select/release printing setting 22 of the printing setting 21 from the selection menu 20 of the top page, a printing setting/release page shown in FIG. 12 is displayed.

In an example shown in FIG. 12, two initial set values of a "standard setting 1" and a "standard setting 2" are registered, and by clicking a check box of a registered name of the initial set value shown in items of "select a printing setting" with a mouse etc., and selecting and instructing a "select" button, initial set values to be set to the printer driver 14a of each client PC is able to be selected. Moreover, by clicking a check box of a registered name of the initial set value shown in items of "delete a printing setting" with a mouse etc., and selecting and instructing a "delete" button, a registry file of initial set values which have become unnecessary is able to be deleted.

Figure 13:
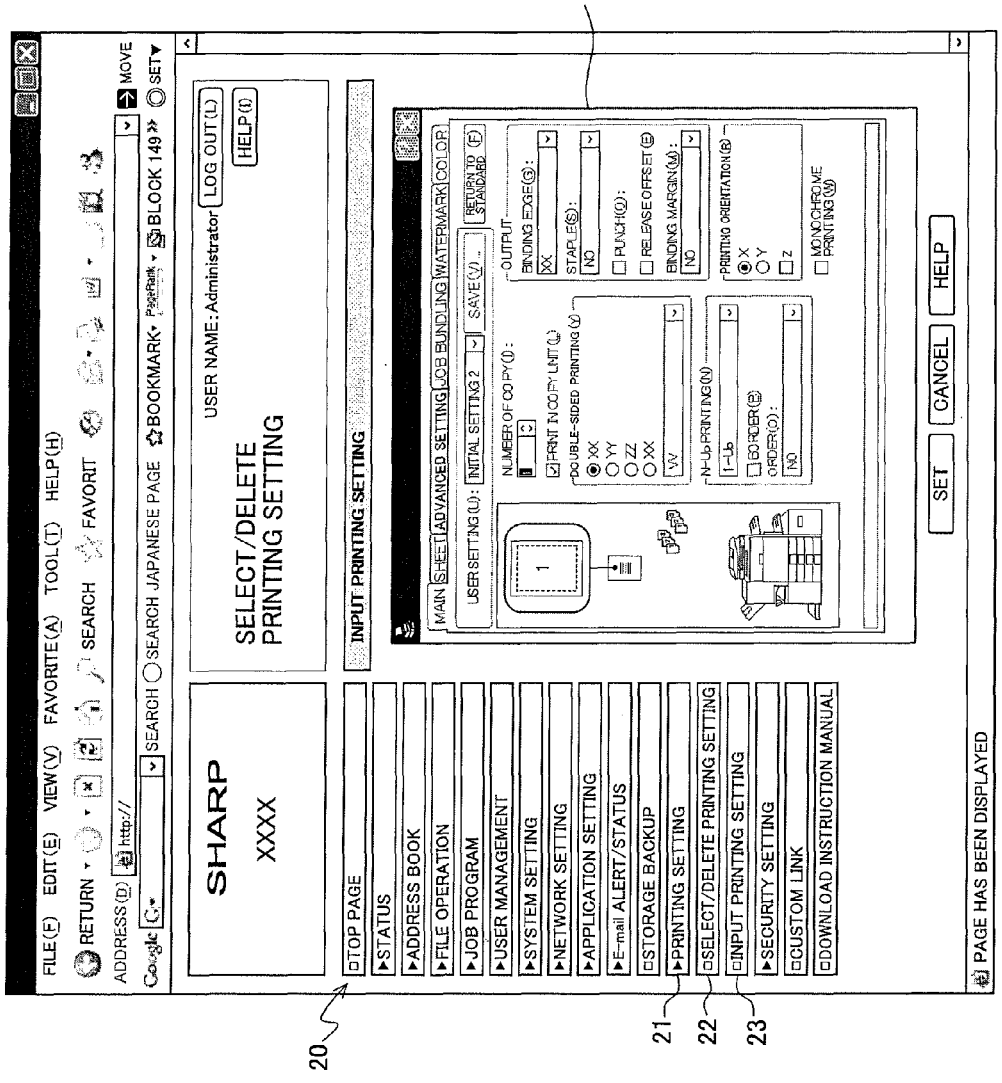
FIG. 13 is a view showing an example of a printing setting inputting page.

In addition, when the user selects and instructs the input printing setting 23 from the selection menu 20 of the top page shown in FIG. 11, a printing setting inputting page 24 shown in FIG. 13 is displayed. Here, it is possible to input or confirm initial set values. In this example, it is possible to call up initial set values which have been already registered by selecting "user setting", and also to register new initial set values by inputting a new registered name. Moreover, each item which is input as an initial set value is same as the printing condition which is set by each user in printing, and it is possible to input initial set values easily by making the setting screen be same.

In this way, the manager sets standard printing conditions of the printer driver 14a to the MFP 7 as a standard setting, thus even if a user of the client PC 1 is inexperienced and does not know standard printing conditions, it is possible to obtain the standard setting above at the time of activation of the printer driver 14a, and make a setting automatically. Therefore, the user is no longer confused about setting printing conditions and able to perform printing processing smoothly.

Figure 14:
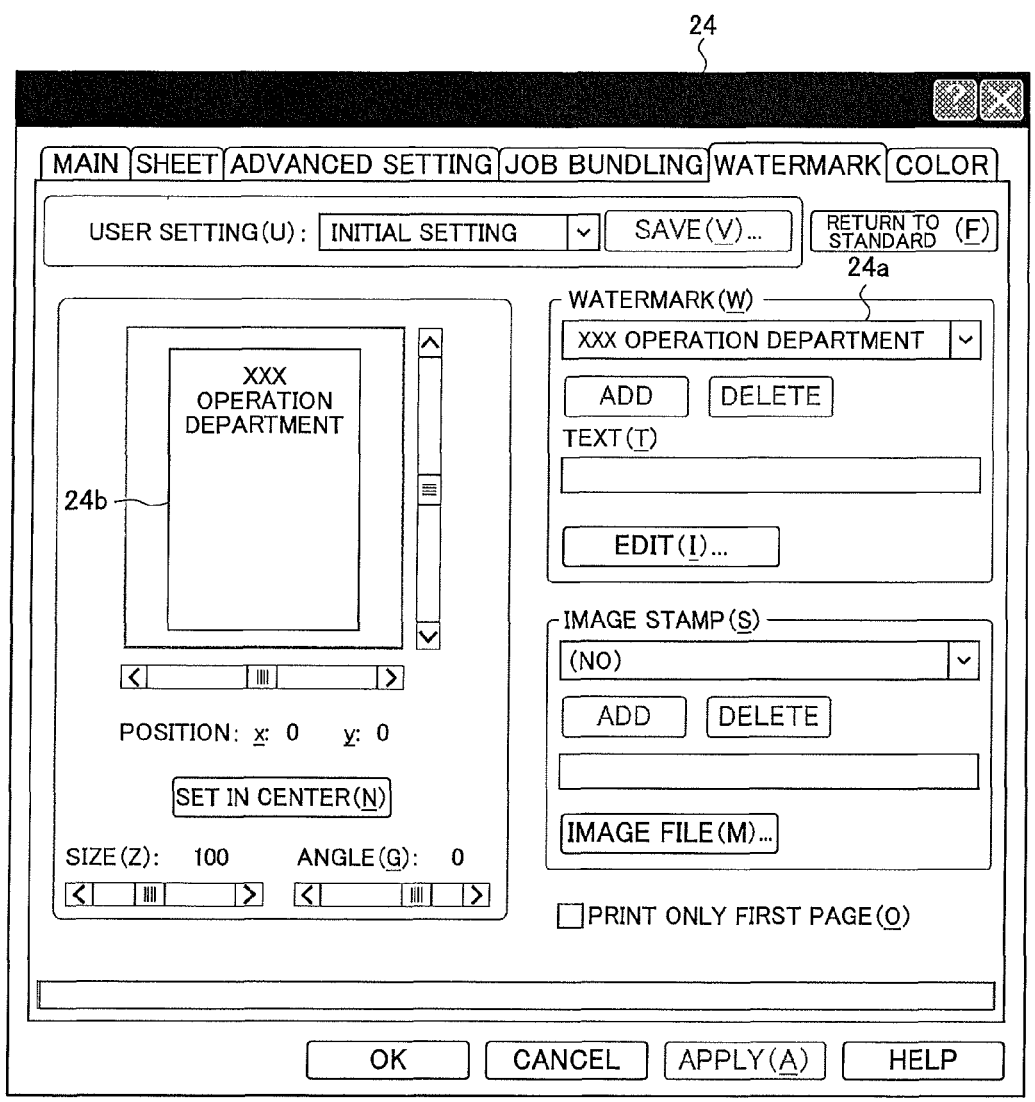
FIG. 14 is a view showing an example of a screen which is displayed when a watermark tab is selected on the printing setting inputting page shown in FIG. 13.

FIG. 14 is a view showing an example of a screen which is displayed when a watermark tab is selected on the printing setting inputting page 24 shown in FIG. 13. The printing setting inputting page 24 displays the watermark tab so as to be switchable. For example, in the case where a logo of a company etc., or a department name is changed, when a manager inputs a department name etc., which is desired to be changed in a watermark inputting field 24a, a preview 24b including the department name is displayed. The manager, while looking at the preview 24b, adjusts a position on a sheet, and when clicking the "OK" button, the setting is registered. Initial set values including such a setting of a watermark are stored in the MFP 7, thus the setting is reflected on the printer driver 14a of the client PC 1, and thereafter printing data that the user performs a printing instruction from the client PC 1 to the MFP 7 is printed with the watermark added.

In this way, it is possible to collectively change, for example, a logo of a company etc., and a department name which are added to printing data for a plurality of client PCs connected to the MFP 7, and therefore work burden on a manager is able to be reduced to a large extent.

In the description above, description has been given centering on an embodiment of a printer driver or an information processing apparatus on which the printer driver is installed, however, the present invention is not limited thereto, and may have a form as a printing system comprised of the information processing apparatus and an external storage apparatus or a printer driver setting method by the printing system, and further, may have a form of a computer-readable recording medium having the printer driver recorded therein.

Description will be given for an embodiment of a recording medium having the printer driver according to the present invention recorded therein. As a recording medium, specifically, a CD-ROM(-R/-RW), a magnetic optical disc, a DVD-ROM(-R/-RW/-RAM), an FD, an HD, a flash memory, a memory card, a memory stick and other various ROMs and RAMs etc., are able to be assumed. It may be configured that the recoding medium having the printer driver recorded therein is distributed, the recording medium as above is mounted on an information processing apparatus such as a computer, and the printer driver is read out by the information processing apparatus, or that the printer driver is stored in a recording medium provided in an information processing apparatus and read out as necessary.

According to the present invention, update initial set values set by a manager are able to be obtained each time a printer driver is activated, and therefore changing of a setting such as changing of printing conditions due to ecology-printing etc., and changing of an option configuration such as a large capacity cassette is able to be reflected promptly and reliably.

The invention claimed is:

1. A printer driver configured to be installed on an information processing apparatus, the printer driver comprising:
    an access portion which accesses an external storage apparatus storing initial set values of the printer driver in each activation;
    a set value comparing portion which compares the initial set values set to the printer driver and initial set values stored in the external storage apparatus; and
    a set value selecting portion which selects either the initial set values of the printer driver or the initial set values stored in the external storage apparatus based on a comparison result,
    wherein as a result of comparison of the initial set values set to the printer driver and the initial set values stored in the external storage apparatus, when initial set values of at least one item are different, the set value selecting portion selects initial set values having a higher energy saving effect among an initial set value of the printer driver and an initial set value stored in the external storage apparatus for the item.

2. The printer driver as defined in claim 1, wherein
    when the initial set values of at least one item of the printer driver are updated to the initial set values stored in the external storage apparatus, a message for notifying a user of that effect is able to be displayed on a display portion of the information processing apparatus.

3. A printer driver configured to be installed on an information processing apparatus, the printer driver comprising:
    an access portion which accesses an external storage apparatus storing initial set values of the printer driver in each activation;
    a set value comparing portion which compares the initial set values set to the printer driver and initial set values stored in the external storage apparatus; and
    a set value selecting portion which selects either the initial set values of the printer driver or the initial set values stored in the external storage apparatus based on a comparison result,
    wherein as a result of comparison of the initial set values set to the printer driver and the initial set values stored in the external storage apparatus, when initial set values of at least one item are different, the set value selecting portion is able to display a selecting screen for causing a user to select either the initial set values of the printer driver or the initial set values stored in the external storage apparatus for the item on a display portion of the information processing apparatus.

4. The printer driver as defined in claim 3, wherein
    whether or not to update the initial set values stored in the external storage apparatus is able to be selected by a user on the selecting screen, and when the update of the initial set values stored in the external storage apparatus is not selected by the user, display of the selecting screen is not performed until update date and time or version information of the initial set values stored in the external storage apparatus is updated.

5. The printer driver as defined in any one of claims 1 and 3,
    wherein when the initial set values stored in the external storage apparatus are selected by the set value selecting portion, the initial set values set to the printer driver are updated by the selected initial set values.

6. The printer driver as defined in any one of claims 1, 3, and 4,
    wherein the set value comparing portion compares update date and time of the initial set values set to the printer driver and update date and time of the initial set values stored in the external storage apparatus to thereby judge whether or not the initial set values of at least one item are different.

7. The printer driver as defined in any one of claims 1, 3, and 4,
    wherein the set value comparing portion compares version information of the initial set values set to the printer driver and version information of the initial set values stored in the external storage apparatus to thereby judge whether or not the initial set values of at least one item are different.

8. The printer driver as defined in any one of claims 1, 3, and 4,
    wherein when a printing icon of an application provided in the information processing apparatus is selected and instructed by a user, the access portion temporarily holds the selected and instructed printing icon and thereafter accesses the external storage apparatus.

9. A non-transitory computer-readable recording medium having the printer driver as defined in any one of claims 1, 3, and 4 recorded therein.

10. A printing system in which an information processing apparatus having a printer driver installed thereon and an external storage apparatus which stores initial set values of the printer driver are connected through a network, wherein
    the information processing apparatus includes a version information transmitting portion which transmits version information of the initial set values set to the printer driver to the external storage apparatus each time the printer driver is activated,
    the external storage apparatus includes an initial set value extracting portion which compares version information transmitted from the information processing apparatus and version information stored in the external storage apparatus, and when version information is different, extracts updated initial set values from initial set values stored in the external storage apparatus, and an initial set value transmitting portion which transmits the extracted initial set values to the information processing apparatus, and the information processing apparatus is able to set the initial set values transmitted from the external storage apparatus as the initial set values of the printer driver.

11. The printing system as defined in claim 10, wherein the external storage apparatus is a printing apparatus or a server apparatus.

12. A printer driver setting method by a printing system in which an information processing apparatus having a printer driver installed thereon and an external storage apparatus which stores initial set values of the printer driver are connected through a network, wherein the information processing apparatus includes a version information transmitting step of transmitting version information of the initial set values set to the printer driver to the external storage apparatus each time the printer driver is activated, the external storage apparatus includes an initial set value extracting step of comparing version information transmitted from the information processing apparatus and version information stored in the external storage apparatus, and when version information is different, extracting updated initial set values from initial set values stored in the external storage apparatus, and an initial set value transmitting step of transmitting the extracted initial set values to the information processing apparatus, and the information processing apparatus is able to set the initial set values transmitted from the external storage apparatus as the initial set values of the printer driver.

* * * * *